United States Patent
Tanaka et al.

[15] 3,665,595
[45] May 30, 1972

[54] METHOD OF MANUFACTURING SUPERCONDUCTIVE MATERIALS

[72] Inventors: Eihachiro Tanaka; Yutaka Onodera, both of Sendai; Takeji Fukuda, Kanuma; Tsutomu Yamashita, Sendai; Tetsuo Saito, Tokyo; Shoji Kumia, Hitachi, all of Japan

[73] Assignee: The Research Institute for Iron, Steel and Other Metals of The Tohoku University, Sendai City, Japan

[22] Filed: Oct. 27, 1969

[21] Appl. No.: 869,719

[30] Foreign Application Priority Data

Oct. 31, 1968 Japan.................................43/78863
Mar. 19, 1969 Japan.................................44/20592
Mar. 19, 1969 Japan.................................44/20593
Mar. 19, 1969 Japan.................................44/20594

[52] U.S. Cl...............................................29/599
[51] Int. Cl. .........................................H01v 11/00
[58] Field of Search.....................................29/599

[56] References Cited

UNITED STATES PATENTS 3,465,430 9/1969 Barber et al............................29/599
3,473,217 10/1969 Prior........................................29/599
3,218,693 11/1965 Allen et al. .............................29/599
3,243,871 4/1966 Saur........................................29/599
3,258,828 7/1966 Swartz....................................29/599

Primary Examiner—John F. Campbell
Assistant Examiner—Donald C. Reiley, III
Attorney—Sughrue, Rothwell, Mion, Zinn & Macpeak

[57] ABSTRACT

Superconductive materials are manufactured by providing a laminated material by combining a material of Nb, V or Mo metal, or alloy or intermetallic compound thereof and a material of Sn, Al, Zr, Ti, Pb, Ge, V, Si, Ga, C or Au element or alloy thereof, winding the laminated material tightly into a coil, covering the coiled body with a shielding layer composed of Nb, Ta or Zr metal or alloy thereof or stainless steel, inserting the coil covered with the shielding layer into a sheath composed of Cu, Al, Ag, Au or Cd metal, or alloy or intermetallic compound thereof or stainless steel, subjecting said sheath enclosing said coil and said shielding layer to a treatment for reducing a cross-sectional area of said coil and heat-treating thus treated coil. The laminated material may be inserted into the sheath together with a mechanically reinforcing material in order to improve the strength of the resulting superconductive materials.

6 Claims, 22 Drawing Figures

METHOD OF MANUFACTURING SUPERCONDUCTIVE MATERIALS

The present invention relates to novel methods of manufacturing superconductive materials, for example materials provided with properties required for coil material of a superconductive magnet, which can generate a strong magnetic field in a superconductive state.

For these superconductive materials the following properties are required.

1. The superconductive phenomenon can be effectively developed and a large current can flow therethrough.
2. The superconductivity is maintained in a strong magnetic field.
3. The critical temperature, at which the superconductivity occurs is as high as possible.

Furthermore, when the superconductive materials are used for the above described superconductive magnet, it is necessary for them to be molded into a coil form and therefore such materials must be formed into wire or string.

Heretofore, as the wires for the superconductive magnet, alloys such as Nb–Zr, Nb–Ti and the like and β–W type crystal of intermetallic compounds, such as $Nb_3Sn$, $Nb_3Al$, etc. have been used.

These alloys of Nb–Zr, Nb–Ti and the like are easily wire-drawn and in the fine wires they are used after coated with copper but the properties are inferior to those of the β–W type crystal of $Nb_3Sn$, $Nb_3Al$, etc.

On the other hand, the intermetallic compounds, such as $Nb_3Sn$ and $Nb_3Al$ are hard and brittle and are wire-drawn with difficulty. Therefore, the technic for wire-drawing these materials are very important in the art and numerous attempts have been made.

For manufacture of $Nb_3Sn$ wire, the following processes have been proposed.

1. In a Nb tube are charged powdery Nb and Sn and the Nb tube charged powdery Nb and Sn is wire-drawn and the thus obtained tube having a small diameter, the interior of which is compactly filled, is coiled and then heat-treated.
2. A Nb string is immersed in a Sn bath and coated with Sn and the coated Nb string is heat-treated to diffuse Sn into Nb string.
3. A stainless steel string is introduced into a quartz vessel and vaporous $NbCl_5$ and $SnCl_2$ are fed into the vessel and then reduced with hydrogen at a temperature of 930°C, to form $Nb_3Sn$ on the surface of the stainless steel string.

The above process (1) has defects that the product is useful only for wire of coil of a small scale of superconductive magnet and that in the step for charging the powdery materials and the wire-drawing step, the powdery materials are mixed heterogeneously.

In the above process (2), the diffused layer is about 0.01 mm and is extremely thinner than the non-diffused layer and is insufficient to be utilized for superconductive materials.

In the above process (3), the thickness of the formed film is also at most 0.01 mm and only the surface layer, which is a small rate based on the cross-section of the wire, contributes to superconductivity and the manufacture is not effective and needs a large installation.

Moreover, a manufacture of $Nb_3Al$ is more difficult than that of the above described $Nb_3Sn$ and has not been fully developed.

The present most improved method for manufacturing the superconductive materials comprises combining elements to constitute the superconductive materials, for example, Nb, Sn, Al, Ti, Ge and V sheets or foils in such a composition that the superconductive alloy or superconductive compound is formed, laminating them or winding them into a coil, housing the resulting laminate or coil in a sheath, subjecting the assembly including said sheath and said laminate or coil housed therein to a treatment for reducing the diameter of said assembly repeatedly to form a wire having an adequate cross-section and heat-treating the formed wire.

According to this process, it is possible to obtain the superconductive material having a large cross-section, a texture of an extremely thin multi-layers, a high working ratio, a high resistance to the movement of flux-line and a high critical current density. The optimum temperature of the heat-treatment varies depending upon the superconductive material to be manufactured but, in general, it is preferable to promote once the diffusion at a high temperature and then to effect a treatment for forming the superconductive alloy or superconductive compound at the optimum temperature.

As the above described sheath materials, use may be made of Cu, Al Ag, Au or Cd metal or the alloy thereof, or stainless steel or high melting metals, such as Nb, Ti, V or Ta metal or alloy or intermetallic compound thereof.

However, if Cu is used as the sheath and a thin Al or Sn layer is dissolved off in the heat-treatment, an alloy with Cu of the sheath is formed and transmits and expands and consequently the properties of the superconductive material are lost. However, it has been found that this defect can be solved by interposing a Nb sleeve between the laminate or coil and the sheath and preventing the formation of Cu-Al or Cu-Sn alloy.

Furthermore, it is assumed that Pb is also useful as the shielding layer but there is a fear that Pb itself is dissolved and flowed and the shielding effect is not attained, but it can be utilized effectively in some case.

The inventors have made investigations with respect to the shielding effect of various materials and found that considering various points, for example, resistance for deformation, extendability and formation of alloy Nb can attain the heat-treatment effectively as the shielding layer without adversely affecting on the superconductive material and provide favorable results.

In addition, as the shielding materials, Ta or Zr metal or alloys or intermetallic compounds thereof or stainless steel can be used other than Nb.

Namely, the first aspect of the present invention consists in a method of manufacturing superconductive materials, which comprises providing a laminated material by combining a material (A) selected from the group consisting of Nb, V and Mo metals and the alloys and intermetallic compounds thereof and a material (B) selected from the group consisting of Sn, Al Zr, Ti, Pb, Ge, V, Si, Ga, C and Au elements and alloys thereof in such a composition that a superconductive alloy or a superconductive intermetallic compound is formed, winding the laminated material tightly into a coil, covering the coiled body with a shielding layer selected from the group consisting of Nb, Ta and Zr metals and the alloys thereof and stainless steel, housing the shielding layer covered the coiled body in the above described sheath, subjecting said sheath housing said coiled body and said shielding layer to a treatment for reducing a cross-sectional area of said coiled body (abridged as a cross-section reducing treatment), for example rolling, extruding or drawing treatment and heat treating the cross-section reduced body at a temperature higher than 600° C and lower than a melting point of the sheath.

The above described laminated materials may be manufactured by the following processes. A sheet or foil of the above described material A and a sheet or foil of the above described material B are laminated or a sheet or foil of the material A and a sheet or foil of the above described material B are rolled and adhered to form a composite sheet. Alternatively, on a sheet of the above described material A is coated an element in the material B which can be easily coated by a vacuum evaporation, spattering or plating, for example, Sn, Al, Si, Ga, Ge, C or Au to form the coated sheet and if necessary the coated sheets are laminated.

According to the present invention, the cross-section reducing treatment of the coiled body may be effected by a cold working but can be effected easily by a hot working at a temperature of 400°–650° C to form the extremely thin multi-layered material. A temperature higher than 650° C is too near the melting point of Al and is not proper and there is a danger that a brittle alloy layer is formed, so that such a temperature must be avoided.

The thin multi-layered composite material formed by the above described cross-section reducing treatment is covered by the sheath through the shielding layer and consequently the coiled body is under vacuum and is not influenced by the ambient atmosphere during the above described working and the succeeding heat-treatment.

Consequently, a homogeneous intermetallic compound $Nb_3Sn$ can be manufactured by the heat-treatment and an intermetallic compound $Nb_3Al$ can be formed by quenching after the heat-treatment.

It has been found by a measurement that the superconductive materials obtained by the method of the present invention has an electric resistance of 0 below 17° to 18°K.

At a temperature lower than 600°C in the heat-treatment, the formation of the intermetallic compound is difficult. Furthermore, depending upon the kind of sheath material, the maintenance of the sheath material may be unable in the heat-treatment at a temperature higher than 600°C but in this case a cover of stainless steel is used in the heat-treatment. When the stainless steel cover is used, the heat-treatment up to about 1,350°C can be effected.

However, if Cu or stainless steel which is easily subjected to the cross-section reducing treatment, is used as the sheath material in the above described method, it is impossible to carry out the above described heat-treatment at a temperature higher than 1,350°C.

The inventors have made further investigations in this point and found that if metals having a high melting point, such as Nb, Ti, V or Ta or the alloys thereof are used as the sheath materials which can effect the diffusion and formation reaction for forming the superconductive material at a high temperature higher than 1,350°C, the heat-treatment can be carried out at a temperature just below the melting point of said metals and the time of the heat-treatment can be considerably reduced and the properties of the superconductive material can be improved.

In general, as mentioned above the above described heat-treatment is carried out for two objects of the diffusion treatment and the formation treatment and the diffusion treatment can be reduced in the time by using a higher temperature but the formation treatment has an adequate treating temperature, which is different from the temperature for the diffusion.

For example, in manufacture of the superconductive material of $Nb_3Al$, the optimum temperature of the heat-treatment is about 1,600°C.

In manufacture of the superconductive material of three or more components, such as $Nb_3(Al_{0.8}Ge_{0.2})$, the diffusion rate is different according to the element and consequently it is necessary to effect a sufficient diffusion so as not to disturb the composition ratio. Accordingly, it is desired to effect the diffusion treatment at a further higher temperature.

Even when the superconductive material, such as $Nb_3Sn$, which can be easily manufactured by a heat-treatment at a temperature lower than 1,000°C for about 1 hour, is manufactured, the time of the heat-treatment can be considerably reduced by using a temperature higher than that temperature.

Namely, the second aspect of the present invention consists in that the metals having the above described high melting point, such as Nb, Ti, V or Ta or the alloys thereof are used as the sheath material and the heat-treatment is carried out at a temperature higher than 1,350°C and the time of the treatment is considerably reduced, whereby the superconductive materials are continuously manufactured and can be provided in a high efficiency commercially.

Furthermore, the superconductive materials can develop the performance stably in the practical use only by providing with the following properties.

1. A high mechanical strength.
2. Provision of by-path having a high electric conductivity.
3. The sheath material disposing between the cooling medium and the superconductive body has a sufficiently large thermal conductivity.

For the above requirement (1), a sufficient strength is needed to reinforce the mechanical brittleness in the intermetallic compound, such as $Nb_3Sn$ to cause no deformation even under a strong magnetic force.

For the above requirement (2), a material having a low resistance, such as Cu, Ag or Al is generally provided beside the superconductive material in order to by-pass the current flowing locally broken portions due to flux jump and the like to prevent generation of heat at the locally broken portions and transmission of the heat through the whole superconductive wire.

The above requirement (3) is necessary for cooling the heat generated at the broken portions quickly and recovering the superconductivity.

In the above described method, the raw materials having the composition of the superconductive material, which have been wound in a coil are inserted into a sheath composed of mechanically strong material, such as stainless steel or a good conductor, such as Cu or Al and the sheath enclosing the coiled body is subjected to a surface reducing treatment.

However, when Cu or Al is used as the sheath, the mechanical strength of the superconductive material is insufficient, while when stainless steel is used as the sheath, it is difficult to maintain electric and thermal stability.

The third aspect of the present invention consists in a method of manufacturing the superconductive wire, wherein a laminated or coiled material is inserted into a sheath composed of a good conductor, such as Cu or Al together with a mechanically reinforcing material, such as stainless steel and the resulting assembly including said sheath and said laminated or coiled material inserted therein is subjected to a surface reducing treatment and then to a heat-treatment.

FIG. 11 shows the cross-section of a rolling material prior to the rolling step. In FIG. 11A, a mechanically reinforcing material 1 is disposed on several sheet of raw materials 2 to constitute the superconductive material, and in FIG. 11B, a mechanically reinforcing material 1 is disposed on a coiled body 2 to constitute the superconductive material and in FIG. 11C, raw material sheets 2 to constitute the superconductive material is wound around a core composed of a reinforcing material 1 into a coil.

In FIG. 11, 3 shows a shielding layer, by which the diffusion of the raw materials 2 to constitute the superconductive material into the sheath 4 composed of a good conductor is prevented.

FIG. 12 shows the cross-section of a rolling material prior to the wire-drawing step and FIG. 12A is a case where raw material sheets 2 to constitute the superconductive material are coiled tightly around a core of a reinforcing material 1, and FIG. 12B is a case where a reinforcing material 1 is arranged with a coiled body 2 to constitute the superconductive material in a side-by-side relation and in both cases, the raw material sheets to constitute the superconductive material are inserted into a sheath 4 through a shielding layer 3 and then the sheath enclosing the shielding layer and the raw material sheets is wire-drawn.

According to the third aspect of the present invention, among the above described requirements of the superconductive wire, the item (1) is satisfied by the mechanically reinforcing material 1 and the items (2) and (3) are satisfied by the sheath 4 composed of a good conductor.

Moreover, the outer sheath 4 and the raw material sheets 2 to constitute the superconductive material are adhered very closely through the treatment for reducing the diameter and the succeeding heat-treatment to form a very stable superconductive wire.

Furthermore, according to the method of the present invention any special step is not necessary for stabilizing the superconductive wire and the production step can be considerably simplified.

For a better understanding of the invention, reference is taken to the accompanying drawings, wherein:

FIG. 1 is a side view showing an apparatus for coiling the raw material sheets to constitute the superconductive material, which is used for manufacture of the superconductive material of the present invention;

FIG. 2, I to IV are sectional views showing coiled bodies to manufacture the superconductive material alone or enclosed in a sheath and/or a shielding layer prior to subjecting them to a drawing step;

FIG. 3, A to D are sectional views showing the superconductive materials obtained by the present invention respectively;

Figure 11A:
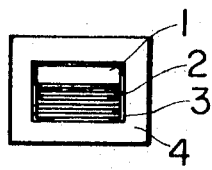
Figure 11B:
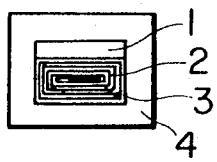
Figure 11C:
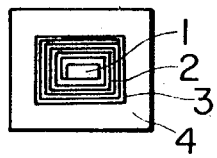
Figure 12A:
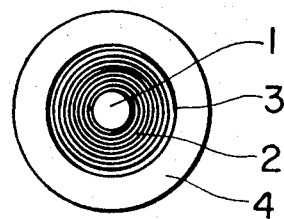
Figure 12B:
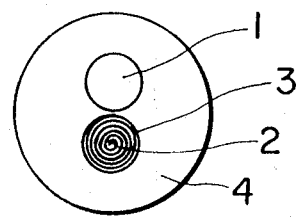
Figure 13:
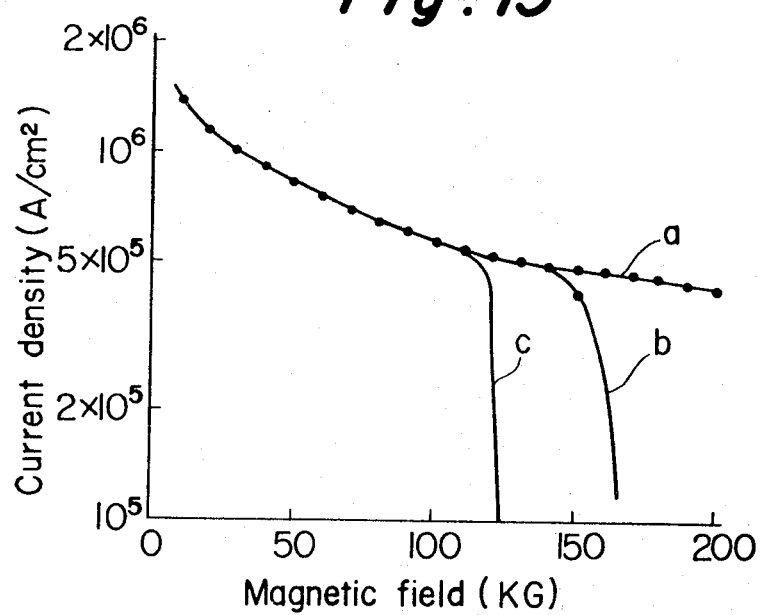
Figure 14:
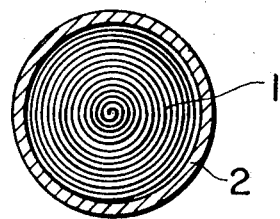
Figure 15:
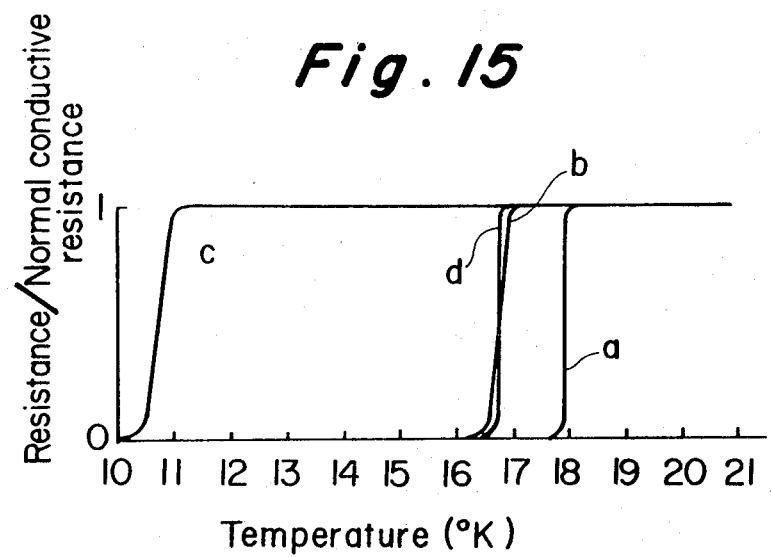
Figure 16:
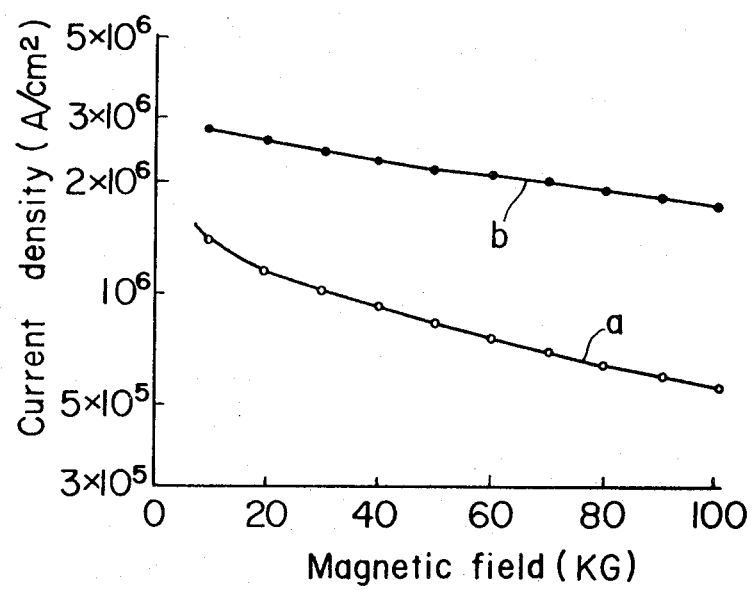

FIG. 11, A to C and FIG. 12, A and B are sectional views of various embodiments of raw material sheets to constitute the superconductive material, which are mechanically reinforced by using a reinforcing material respectively;

FIG. 13 is a graph showing a relation of magnetic field to critical current density of $Nb_3Sn$;

FIG. 14 is a sectional view of an embodiment of coiled body for carrying out the method of the present invention;

FIG. 15 is a graph showing a relation of electric resistance to critical temperature of an embodiment of superconductive material according to the present invention; and FIG. 16 is a graph showing a relation of magnetic field to critical current density of an embodiment of superconductive material according to the present invention.

The invention will now be described with reference to embodiment of the invention.

Figure 1:
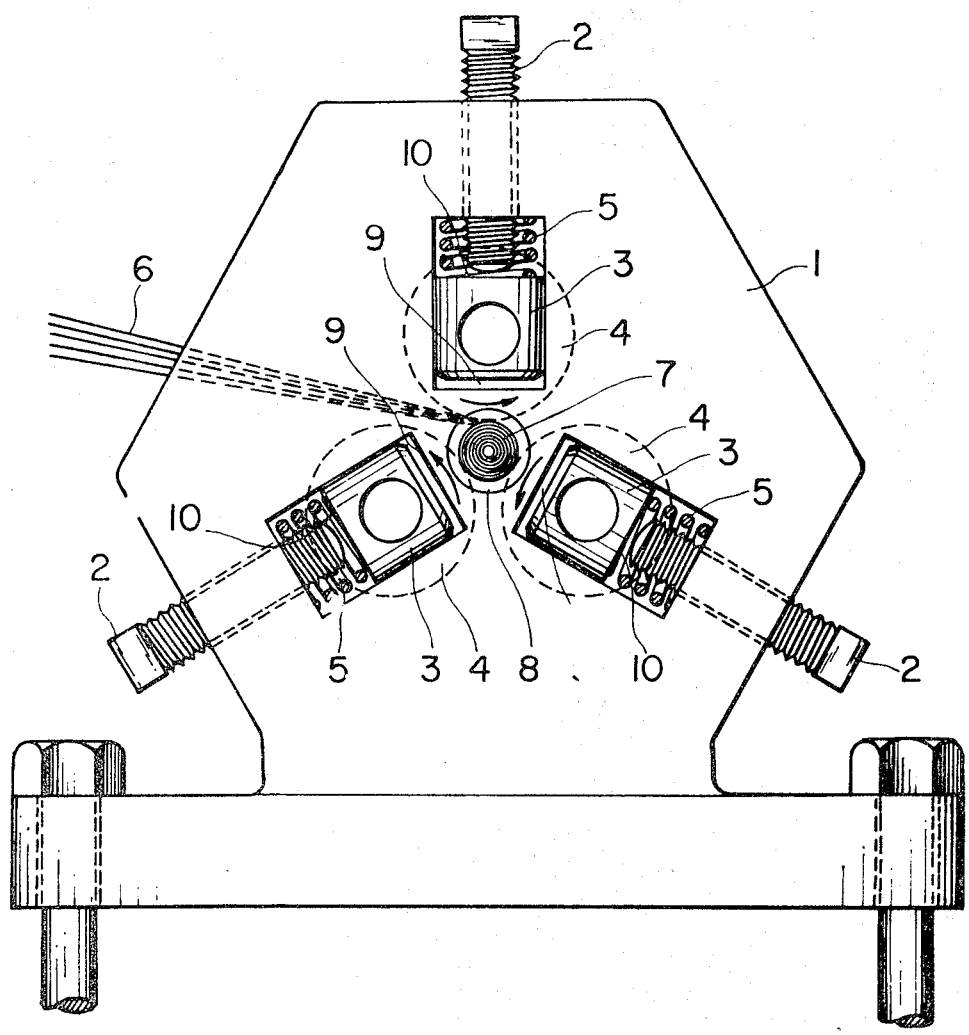

Referring at first to FIG. 1 there is shown an apparatus comprising three rolls and for winding band shaped material into a multi-layered coil whose turns are closely adhered one upon the other, in which 1 designates a machine frame, 2 push bolts angularly spaced one from the other by 120°, 3 metal blocks, and 4 rolls adapted to be rotated in a direction shown by an arrow by means of a gear (not shown). The metal blocks 3 are urged against the coil 7 in a direction passing through its center means of springs 5 until the bottoms of the gaps 9 are brought into engagement with one another and the rolls 4 arrive at the minimum diameter position of the coil 7.

The band shaped material 6 is fed manually or automatically into a gap formed between the rolls 4 and wound at first into a hollow coil having a minimum diameter and then wound inside in succession to form a coreless coil. This is because of the fact that the metals 3 are urged against the coil 7 in a direction passing through its center by means of the springs 5. The coreless coil gradually increases its diameter to move outwards the rolls 4 against the action of the springs 5 until the metals 3 make contact with the push bolts 2 where the coil 7 is densely wound up into a coil having the maximum diameter. Thus, it is possible to determine the maximum diameter of the coil. The layers of the coil may be closely adhered together by rotating the coil several turns after the coil has been formed.

The coil thus formed is removed through a window 8 from the apparatus and transferred to the next step.

In the above mentioned winding step, the use of the band shaped material having a constant thickness ensures reproduction of coils each having the same number of turns and the same diameter.

EXAMPLE 1

Manufacture of superconductive material of $Nb_3Al$.

Figure 2:
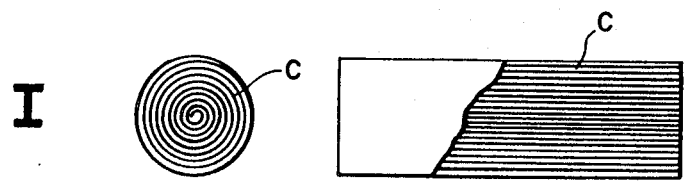
Figure 2:
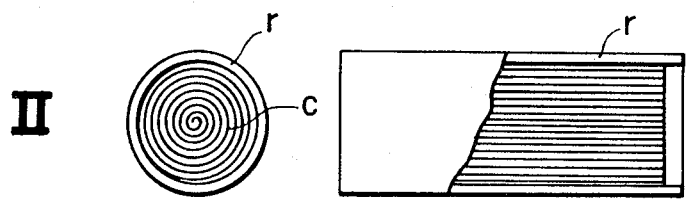
Figure 2:
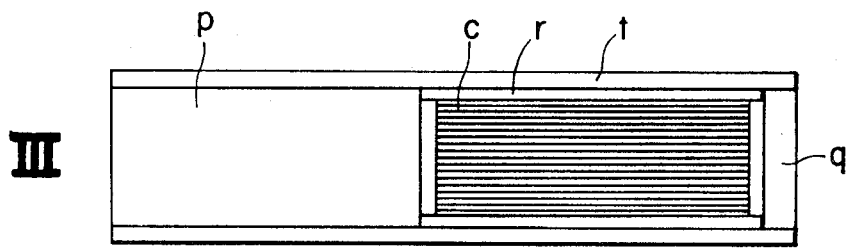
Figure 2:
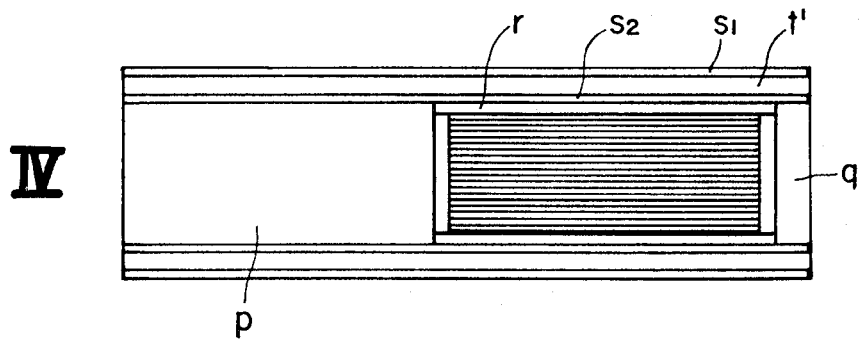

An annealed Nb sheet having a thickness of 0.53 mm and an annealed Al sheet having a thickness of 0.14 mm, which were calculated from atomic weight, were cleansed on the surfaces and the surfaces of both the metal sheets are rolled and adhered to form a composite sheet having a thickness of 0.08 mm and a width of 85 mm. Separately, Nb sheets having a thickness of 0.065 mm and Al sheets having a thickness of 0.016 mm, all the sheets being cleansed, were laminated. The thus obtained composite sheet or the resulting laminated sheets were coiled in the same manner as illustrated in FIG. 1 to form a coiled body c having a diameter of 7.8 mm and a width of 85 mm, which is shown in FIG. 2-I. The coiled body was covered with a Nb shielding layer r having a thickness of 0.5 mm as shown in FIG. 2-II. The coiled body c shielded with the above Nb layer was inserted into a Cu sheath t having an outer diameter of 20 mm and 16 mm, an inner diameter of 10.5 mm and a length of 300 mm. Thus the coiled body c consists of Nb and Al + Nb. One end of the sheath t was sealed with a Cu plug or closed directly and another end was sealed with a Cu plug q or bent inwards and then calked thereon or closed, so that the leakage of the coiled body c was prevented in the drawing step. In this manner the sheath t enclosing the coiled body c and the shielding layer r was drawn from one side or from both sides alternately.

FIG. 3 shows the sectional views of the drawn coiled bodies. FIGS. 3A and 3B are the sectional views of the drawn coiled bodies. When the thickness of the Nb shielding layer was 0.5 mm and 0.2 mm respectively.

FIG. 2-IV shows an embodiment using a hard sheath, which is suitable for producing a fine wire by utilizing a high deformation resistance of the sheath. This case endures a heat-treatment at a temperature higher than 1,000°C and the strength of the sheath can be utilized after the wire has been formed. As the sheath t', stainless steel tube or other hard materials are used and on the outer and inner surfaces of the sheath are applied Cu or Al coatings $S_1$ and $S_2$ respectively, whereby the outer coating $S_1$ prevents burning in the working and the inner coating $S_2$ prevents penetration of Fe and other ferromagnetic materials at the boundary between Nb shielding layer r and the sheath t'.

Cu sheath having an outer diameter of 20 mm and enclosing the shielding layer and the coiled body was subjected to a cold drawing to reduce the diameter to 10–8 mm and to adhere the layers of the coil to each other and then subjected to drawing and rolling treatments alternately repeatedly or to any one of these treatments to reduce the diameter to 3 mm.

Separately, the above described material was subjected to a hot rolling at a temperature of 600° to 650°C to reduce the diameter to 5 mm and then subjected to a drawing to reduce further the diameter to 3 mm.

In addition, a material cold drawn to a diameter of 8 mm was rolled to a square plate having a side of 5 mm and then subjected to a rolling at 600° to 650°C to form a plate having a thickness of 2 mm and thereafter subjected to a cold rolling to form a plate having a thickness of 0.05 to 0.03 mm. In this case, the cross-section was composed of Cu sheath of 0.014 mm, Nb shielding layer of 0.003 mm, Nb + Al of 0.017 mm, Nb shielding layer of 0.003 mm and Cu sheath of 0.014 mm in this order and the total thickness of the plate was 0.051 mm, which is shown in FIG. 3C in an enlarged view, c is the flatted layer of the coiled body, t is the Cu sheath and r is the Nb shielding layer and it was possible to identify this result by a microscope.

The flatted layer c of the coiled body, that is Nb + Al layer, was observed by a usual microscope as in a layer but it has been found that the layer was formed of extremely thin multi-layers of 0.00005 to 0.00002 mm.

Furthermore, into a stainless sheath having an outer diameter of 16 mm, an inner diameter of 10.5 mm and a length of 300 mm was inserted the above described coiled body c and the sheath inserted the coiled body was drawn by changing the drawing direction alternately to an outer diameter of 10 mm and further subjected to drawing steps and when the diameter of tHe drawn body became 10 mm, 5 mm and 2 mm, the drawn body was annealed and subjected to cold and hot drawings to reduce the diameter of the resulting wire to 0.5 mm and then rolled to form a plate having a thickness of 0.05 mm.

In this case, also each layer was separated satisfactorily without being broken as in the case of the Cu sheath and Nb + Al layer was 0.00005 to 0.00002 mm.

In addition, a thin Nb sheet of 0.065 mm and a thin Al sheet of 0.016 mm, which had been annealed and cleansed, were put together and wound into a coiled body, which was covered with double shielding layers of Nb sheet having a thickness of 0.065 mm to form a coiled body c having a diameter of 2.3 mm and a length of 85 mm. The resulting coiled body c was inserted into a Cu sheath having an outer diameter of 7 mm, an inner diameter of 2.5 mm and a length of 300 mm. The sheath enclosing the coiled body c was wire-drawn to form a wire having a diameter of 0.2 mm.

Figure 3A:
Figure 3B:
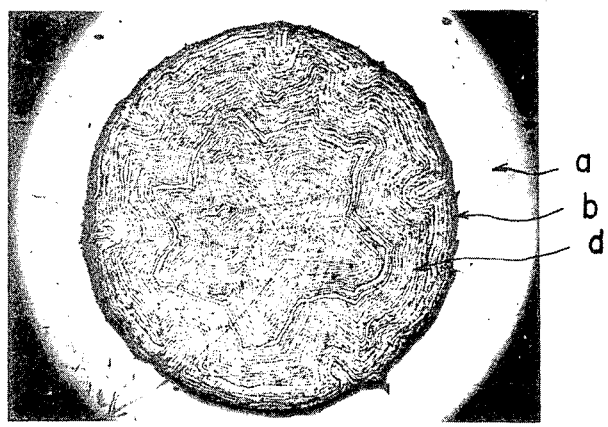
Figure 3C:
Figure 3D:
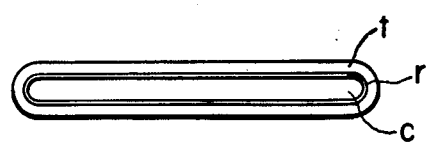

All of these materials were heated at a temperature of 800° to 1,350°C for 30 minutes to 7 hours under carbon atmosphere and then quenched to obtain superconductive materials having a high magnetic field and a high critical temperature, an embodiment of which is shown in FIG. 3D, in which $t$ is a sheath, $r$ is a shielding layer and $c$ is $Nb_3Al$.

Figure 4:
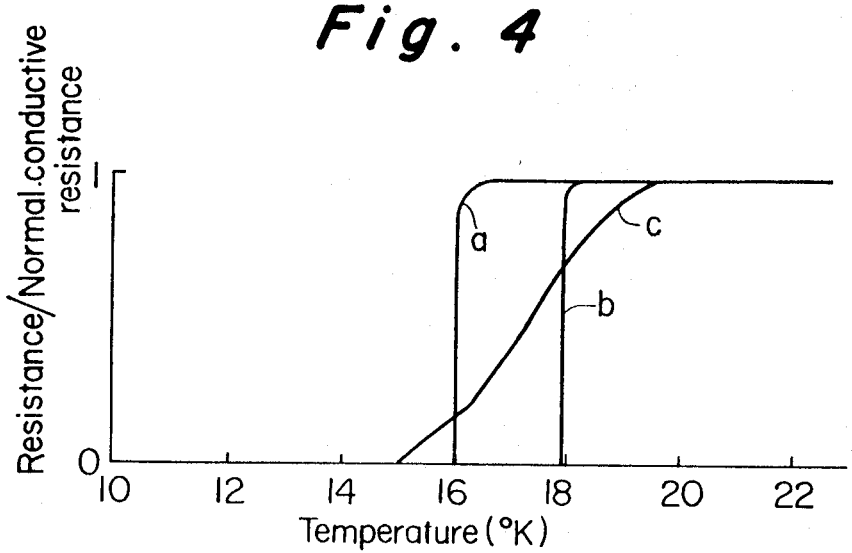
FIG. 4 is a graph showing a relation of electric resistance to critical temperature of an embodiment of superconductive material according to the present invention.
Figure 5:
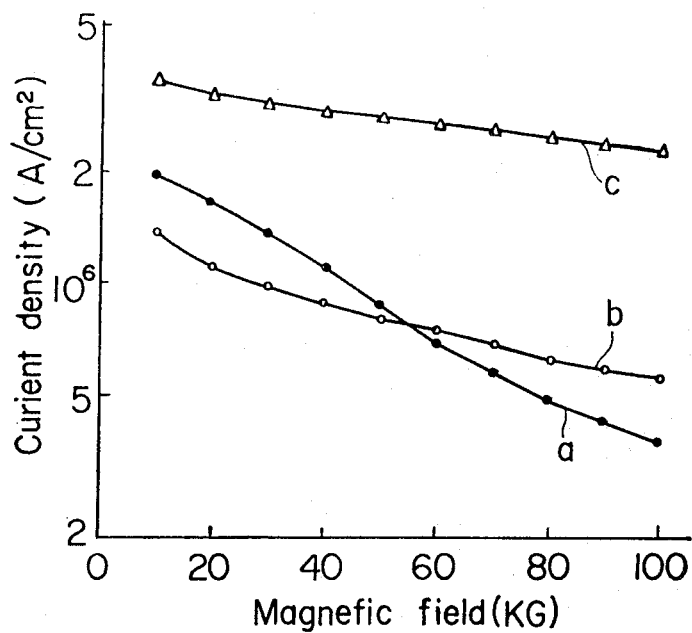
FIG. 5 is a graph showing a relation of magnetic field to critical current density of an embodiment of superconductive material according to the present invention.

The critical temperatures of $Nb_3Al$ treated at a temperature of 1,000°C for one hour is shown in FIG. 4, curve $a$, and the relation of magnetic field to critical current density is shown in FIG. 5, curve $a$.

EXAMPLE 2

Manufacture of superconductive material of $Nb_3Sn$.

An annealed Nb sheet having a thickness of 0.53 mm, a width of 85 mm and a length of 90 mm and a Sn sheet having a thickness of 0.21 mm, a width of 75 mm and a length of 90 mm were cleansed on the surfaces and the Nb sheet was disposed on the Sn sheet such that the center of width of the Nb sheet is in alignment with that of the Sn sheet, and both the sheets were rolled and adhered to form a composite sheet having a thickness of 0.08 mm.

Separately, a Nb sheet having a thickness of 0.08 mm, a width of 85 mm and a length of 400 mm and a Sn sheet having a thickness of 0.02 mm, a width of 75 mm and a length of 400 mm were laminated such that the centers of width of both the sheets are aligned.

Each of them was wound tightly into a coiled body having an outer diameter of 8 mm and a width of 85 mm. This coiled body was covered with a Nb shielding layer having a thickness of 0.3 mm. The thus covered coiled body was inserted into a Cu sheath having an outer diameter of 20 mm, an inner diameter of 10 mm and a length of 300 mm and the openings of both the ends of the sheath were closed. The sheath enclosing the shielding layer and the coiled body was drawn in alternate direction to reduce the diameter to 10 mm and then subjected to either a combination of drawing and rolling steps, any one working of them or rolling step at 600°C to reduce the diameter to 5 mm and to further drawing step to reduce the diameter to 3 mm and to rolling step at 600°C to form a plate having a thickness of 2 mm or 1.5 mm and thereafter to a cold working to obtain a thin plate having a thickness of 0.05 to 0.03 mm.

On the other hand, a stainless steel sheath having an outer diameter of 16 mm, an inner diameter of 10.5 mm and a length of 300 mm was cleansed and into the sheath was inserted a coiled body having an outer diameter of 10 mm and a width of 85 mm formed by the same manner as described above and the sheath enclosing the coiled body was drawn to an outer diameter of 10 mm and when the outer diameter became 10 mm, 6 mm, 3.5 mm and 2 mm, the drawn material was annealed respectively and the annealed material was drawn finally to reduce the diameter to 0.5 mm and thereafter rolled to form a thin plate having a thickness of 0.05 mm.

In addition, a Nb sheet having a thickness of 0.53 mm, a width of 85 mm and a length of 70 mm and a Sn sheet having a thickness of 0.21 mm, a width of 85 mm and a length of 60 mm, were put together and rolled to form a composite sheet having a thickness of 0.1 mm, which was wound tightly into a coil. The resulting coil was covered with three Nb shielding layers to form a coiled body c having an outer diameter of 2.2 mm and a width of 85 mm. The coiled body c was inserted into a Cu sheath having an outer diameter of 7 mm, an inner diameter of 2.5 mm and a length of 300 mm. The sheath enclosing the coiled body c was cold drawn to form a wire having a diameter of 0.2 mm.

In any case of the above described products, extremely thin multi-layers of 0.00002 to 0.00005 mm and having no unevenness in the boundary as shown in FIGS. 3A, 3B and 3C were formed.

These products were annealed at a temperature of 800° to 1,350°C for 30 minutes to 7 hours to obtain the superconductive materials of $Nb_3Sn$ having a high magnetic field and a high critical temperature.

It was possible to form the intermetallic compound at an annealing temperature of 800°C for 5 to 7 hours, a temperature of 900°C for 3 to 5 hours, and a temperature of 1,000° to 1,350°C for 1.5 hours.

The critical temperature of $Nb_3Sn$ obtained by the heat-treatment at a temperature of 800°C for 1 hour is shown in FIG. 4, curve $b$ and the relation of magnetic field to critical current density in $Nb_3Sn$ is shown in FIG. 5, curve $b$.

In each of the above described examples, the ratio of atomic weight of Nb to Al and Nb to Sn was 3 : 1 but as an element for the superconductive magnet it is preferred to determine the ratio so as to remain Nb in the diffused layer owing to the composition of the starting materials or the heat-treatment.

As seen from the above described Examples, according to the present invention it is possible to manufacture easily the wires or strings in which the $\beta$–W type crystal of intermetallic compounds, such as $Nb_3Sn$, $Nb_3Al$ and the like, exist in multi-layers. When the wire obtained by the method of this invention is used as a wire for a superconductive magnet, such a wire has a merit that it can flow an extremely larger amount of current than the wires manufactured by the other methods. Accordingly, the wire according to the present invention can provide the same properties as those provided by magnets when used conventional wires by using a much smaller type of device.

In the above described explanation, there was described that sheets or foils of two kind of metals are wound into a coil having no core, and the coil is inserted into a sheath, which is wire-drawn in alternate direction and rolled and annealed to form superconductive materials but the two kind of metals are not limited to two sheets or foils and may be used by superposing several sheets or foils on each other and winding them into a coil having no core. Furthermore, the metals are not limited to two kinds but may be used in three or more kinds, whereby it is possible to manufacture more complicated intermetallic compounds.

The raw materials to be used for forming the coil are not limited to one component element and may be an alloy or a compound. For example, by using Al 0.8 and Ge 0.2 alloy foil and Nb foil are used it is possible to manufacture a wire or string in which multi-layers of $Nb_3(Al_{0.8}Ge_{0.2})$ exist.

EXAMPLE 3

Manufacture of superconductive material of $Nb_3(Al_{0.8}Ge_{0.2})$.

A Nb sheet having a thickness of 0.50 mm and an Al (80%)–Ge (20%) alloy sheet having a thickness of 0.16 mm were cleansed on the surfaces and both the sheets were put together and rolled and adhered to form a composite sheet having a thickness of 0.09 mm, which was wound tightly into a coil having an outer diameter of 10 mm. This coil was inserted into a stainless steel sheath having an outer diameter of 18 mm and an inner diameter of 10 mm and the sheath enclosing the coil was subjected to a cold drawing to form a wire having a diameter of 10 mm and thereafter when the diameter became 10 mm, 6 mm, 3.5 mm and 2 mm respectively, the drawn wire was annealed and the thus annealed wire was finally drawn to reduce the diameter to 0.5 mm.

The wire was heated at a temperature of 800°–1,350°C for 10 minutes to 24 hours to form a superconductive material of $Nb_3(Al_{0.8}e_{0.2})$ having a high magnetic field and a high critical temperature. FIG. 4, curve c shows a critical temperature of the wire annealed at 1,000°C for 1 hour and FIG. 5, curve c shows a relation of magnetic field to critical current density of the same sample.

According to the present invention, it is possible to manufacture more easily the wire for the superconductive magnet having excellent properties than the conventional processes and to effect a mass production and by using this wire it is possible to manufacture the superconductive magnet having a high economy and a high efficiency.

EXAMPLE 4

Manufacture of superconductive material of $Nb_3Al$.

Figure 6:
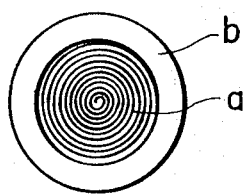
FIG. 6 is a sectional view of a coiled body of the raw material sheets to constitute the superconductive material, which is inserted into a sheath material having a high melting point.

An annealed Nb sheet having a thickness of 0.53 mm and an annealed Al sheet having a thickness of 0.14 mm were cleansed on the surfaces and both the sheets were put together and rolled and adhered to form a composite sheet having a thickness of 0.08 mm, which was wound tightly into a coil a having a diameter of 10 mm as shown in FIG. 6. The formed coil was inserted into a Nb sheath b having an outer diameter of 18 mm and an inner diameter of 10 mm.

The sheath enclosing the coil was wire-drawn to form a wire having a diameter of 0.5 mm, which was succeedingly heat-treated at a temperature of 1,600°C for 10 minutes. The critical temperature of the resulting wire is shown in FIG. 7, curve a.

Figure 7:
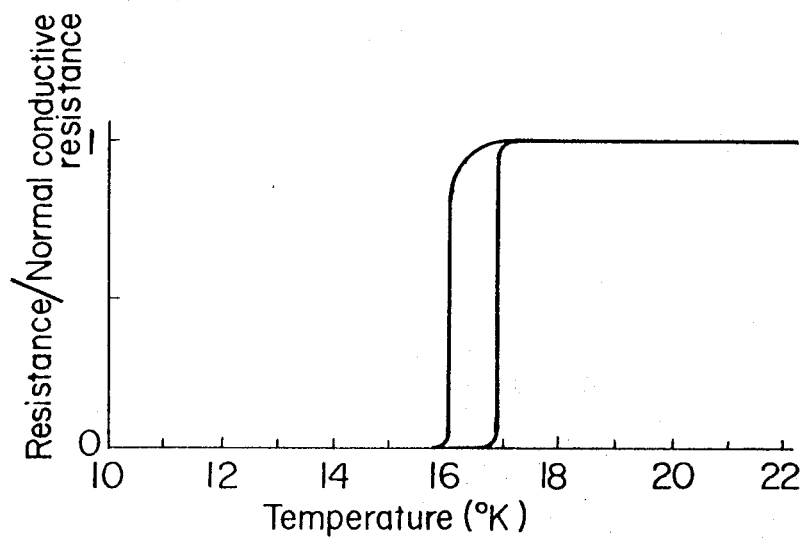
FIGS. 7 and 8 are graphs showing variation of critical temperature of $Nb_3Al$ and $Nb_3(Al_{0.8}Ge_{0.2})$ obtained from the raw material sheets are shown in FIG. 6 owing to difference of the temperature of the heat-treatment respectively.

The critical temperature, when the same wire having a diameter of 0.5 mm was heat-treated at 1,000 °C for 1 hour, is shown in FIG. 7, curve b.

From these facts it can be seen that by effecting the heat-treatment at 1,600°C, the time of the heat-treatment can be remarkably reduced and further the properties can be improved.

EXAMPLE 5

Manufacture of superconductive material of $Nb_3(Al_{0.8}Ge_{0.2})$.

A Nb sheet having a thickness of 0.50 mm and an Al (80%)–Ge (20%) alloy sheet having a thickness of 0.16 mm were cleansed and then put together, rolled and adhered to form a composite sheet having a thickness of 0.09 mm, which was wound tightly into a coil having a diameter of 10 mm. This coil was inserted into a Ta sheath having an outer diameter of 18 mm and an inner diameter of 10 mm and the sheath enclosing the coil was wire-drawn to form a wire having a diameter of 0.5 mm.

This wire was heat-treated in the following manners.
1. heating at 1,600°C for 10 minutes (a)
2. heating at 1,600°C for 10 minutes and then keeping at 800°C for 10 minutes (b)
3. heating at 800°C for 1 hour (c).

Figure 8:
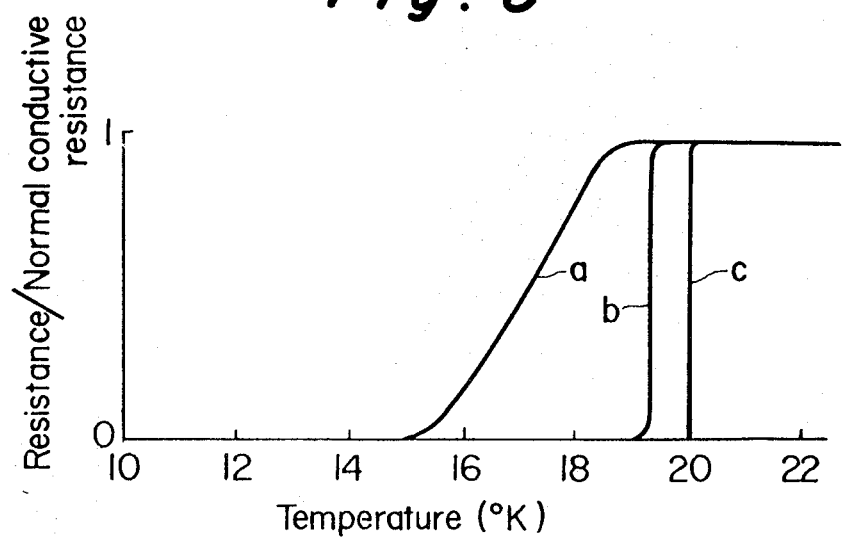

The superconductive properties of these wires are shown in FIG. 8, curves a, b and c respectively.

As seen from FIG. 8, curve b, particularly excellent superconductive properties can be obtained by effecting the diffusion treatment at a high temperature of 1,600°C and then effecting the treatment for forming the intermetallic compound at the optimum temperature of 800°C.

Figure 9:
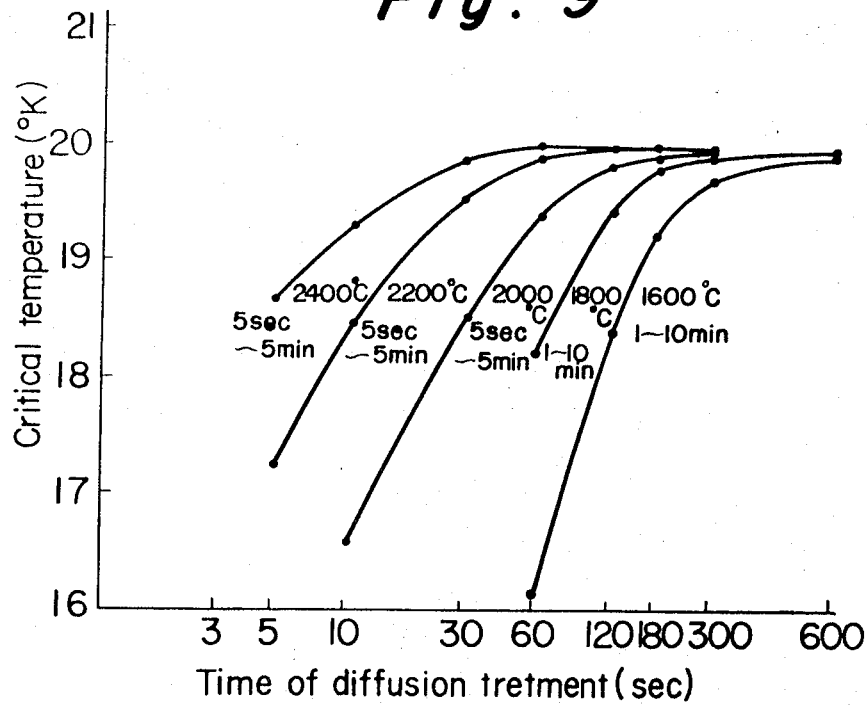
FIGS. 9 and 10 are graphs showing relation of the temperature of heat treatment to the time of heat-treatment of $Nb_3(Al_{0.8}e_{0.2})$ and $Nb_3Sn$ of superconductive materials according to the present invention respectively.

In addition, the above described wire was subjected to the following diffusion treatment
at 1,600°C for 1 to 10 minutes,
at 1,800°C for 1 to 10 minutes,
at 2,000°C for 5 seconds to 5 minutes,
at 2,200°C for 5 seconds to 5 minutes, and
at 2,400°C FOR 5 seconds to 5 minutes
and then to the treatment for forming the intermetallic compound at 800°C for 10 minutes and the relation of the critical temperature to the treatment time is shown in FIG. 9.

From this graph it can be seen that as the temperature of the diffusion treatment increase, the treatment time can be reduced.

EXAMPLE 6

Manufacture of superconductive material of $Nb_3Sn$.

An annealed Nb sheet having a thickness of 0.53 mm and an annealed Sn sheet having a thickness of 0.21 mm were cleansed on the surfaces and both the sheets were put together and rolled and adhered to form a composite sheet having a thickness of 0.08 mm, which was wound tightly into a coil having a diameter of 10 mm. This coil was inserted into a Nb sheath having an outer diameter of 18 mm and an inner diameter of 10 mm. The sheath enclosing the coil was wire-drawn to form a wire having a diameter of 0.5 mm.

This wire was treated as follows:
1. after the diffusion treatment at 1,600°C for 1 to 10 minutes, effecting the formation treatment at 800°C for 10 minutes (a)
2. after the diffusion treatment at 1,000°C for 10 minutes to 1 hour, effecting the formation treatment at 800°C for 10 minutes (b)
3. heat treating at 800°C for 10 minutes to 24 hours (c)

Figure 10:
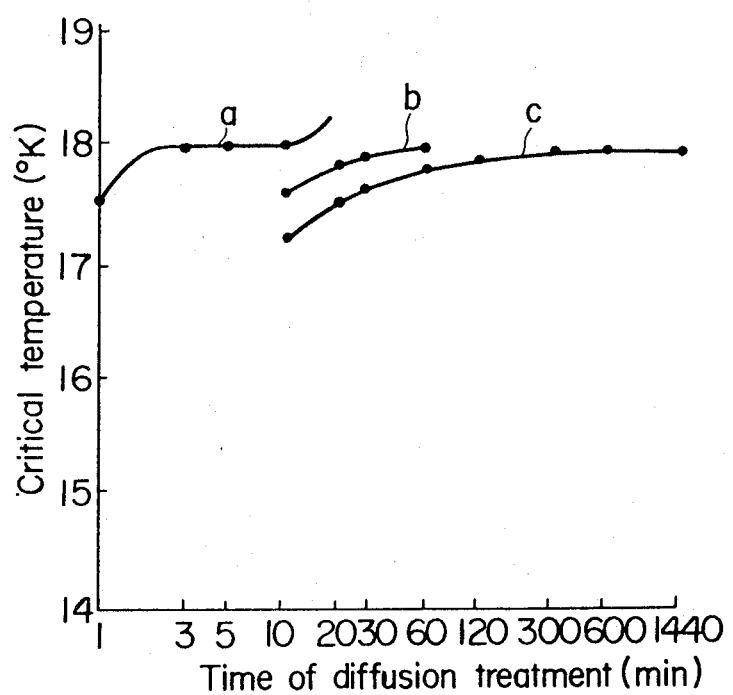

The relation of the critical temperature to the treatment time of the resulting wires are shown in FIG. 10, curves, a, b and c respectively. From FIG. 10, it can be seen that the treatment time can be remarkably reduced by increasing the temperature of the heat-treatment.

As mentioned above, in the manufacture of the superconductive materials according to the present invention, the use of the metals having a high melting point, such as Nb, Ti, V and Ta or the alloys thereof as the sheath permits to raise the temperature of the heat-treatment to just below the melting point of the sheath material and the advantages obtained therefrom are as follows:

1. By raising the temperature of the diffusion treatment, it is possible to decrease the diffusion time, whereby the superconductive materials can be manufactured continuously in industry and further in the formation of multi-component superconductive material, a sufficient diffusion can be expected and therefore the properties of the superconductive materials can be improved. 2. The manufacture of the superconductive material, which needs a high temperature for the formation treatment, can be effected easily and the properties can be improved.

EXAMPLE 7

Manufacture of superconductive wire of $Nb_3Sn$.

An annealed Nb sheet having a thickness of 0.53 mm, a width of 85 mm and a length of 90 mm and a Sn sheet having a thickness of 0.21 mm, a width of 75 mm and a length of 90 mm were cleansed on the surfaces and both the sheets are put together in such a manner that the centers of width of both the sheets are aligned and both the sheets were rolled and adhered to form a composite sheet having a thickness of 0.08 mm, which was wound tightly around a stainless steel rod having a diameter of 5 mm into a coil. This coil was covered with a Nb sheet having a thickness of 0.1 mm as a shielding layer and the coil covered with the Nb shielding layer was inserted into a highly pure Cu pipe sheath having an outer diameter of 17 mm and an inner diameter of 10 mm and the sheath enclosing the shielding layer and the coil was wire-drawn. In this case, by applying the stainless steel pipe to a backward tension in the wire-drawing step, the stainless steel can be reduced in the diameter in the same ratio as the other materials.

FIG. 12A shows the sectional view of the material to be wire-drawn in the above case.

The wire-drawing step was repeated until the outer diameter of the wire became 3 mm and then the thus treated wire was heat-treated at 800°C FOR 15 minutes and the relation of magnetic field to critical current density of the resulting superconductive wire is shown in FIG. 13, curve a.

This superconductive wire was washed with an acid to remove the Cu sheath and then the thus treated wire was measured with respect to the relation of magnetic field to critical current density and the result is shown in FIG. 13, curve b.

From the comparison, it can be seen that the Cu sheath has a stabilizing effect and the property in FIG. 13, curve a shows that the superconductive wire obtained by the present invention is provided with a sufficiently satisfactory stability to be used in practice.

Furthermore, the effect for reinforcing the mechanical strength owing to the stainless steel was determined and the result is shown in the following Table 1.

TABLE 1

|  | Yield strength | Bending (repeating 90° bending) |
| --- | --- | --- |
| Reinforcement by stainless steel | 88 kg | 22 times |
| *No reinforcement | 40 kg | 4 times |

*This comparative sample was manufactured in the same manner as described above except that only the above described Nb sheet and Sn sheet were coiled without using the stainless steel core.

The reinforcing effect of the stainless steel appears apparently in the bending test in the above Table 1.

As shown by FIG. 13, curve c, it can be seen that the magnetic field-critical current density property measured with respect to the sample of no reinforcement breaks at about 120 kGauss.

Even if the backward tension applied to the stainless steel of the reinforcing material in the wire-drawing step is applied to the wire itself the wire-drawing can be carried out and the adjustment of the backward tension and the speed of drawing allows production of superconductive fine wire having a diameter of less than 0.1 mm.

Furthermore, in this Example it is possible to use Al instead of the Cu sheath.

By using such as reinforcing material in the method of the present invention, the following merits can be obtained.

1. The superconductive wire can be manufactured easily.
2. The total surface of the superconductive wire is surrounded by a good conductor and consequently the cooling efficiency is very high.
3. Even formed into a fine wire, the wire has a high mechanical strength.
4. The adhesion between a conductor for stabilizing the superconductive wire and the superconductive material is very high.

EXAMPLE 8

Manufacture of superconductive material of $Nb_3Sn$.

A rolled Nb sheet having a thickness of 0.05 mm was immersed in a melted Sn bath and coated with it to form the coated Nb sheet having a thickness of 0.07 mm, which was wound tightly into a coil having a diameter of 15 mm and this coil was inserted into a Nb pipe having an inner diameter of 15 mm and an outer diameter of 20 mm as shown in FIG. 14, in which 1 is the coil of the laminate and 2 is the Nb pipe.

The Nb pipe enclosing the coil was wire-drawn to reduce the diameter to 3 mm and then rolled to form a thin plate of a thickness of 0.02 mm.

The resulting thin plate was heat-treated at a temperature of 1,800°C for 1 minute to form a superconductive material and the relation of critical temperature to electric resistance of the superconductive material is shown in FIG. 15, curve a and the relation of magnetic field to critical current density thereof is shown in FIG. 16, curve a.

EXAMPLE 9

Manufacture of superconductive material of $V_3Si$.

A rolled V sheet base having a thickness of 0.05 mm was deposited with Si by a vacuum evaporation at a temperature of the base being 1,000°C to form a Si coating of $23\mu$. The coated V sheet was wound tightly to form a coil having a diameter of 15 mm, which was covered by a shielding layer of V sheet having a thickness of 0.1 mm. Then the coil covered by the shielding layer was inserted into a stainless steel pipe having an outer diameter of 20 mm and an inner diameter of 15.2 mm and the pipe enclosing the shielding layer and the coil was wire-drawn repeatedly to form a wire having a diameter of 0.5 mm.

The resulting wire was heat-treated at a temperature of 900°C for 1 hour to obtain a superconductive material and the relation of critical temperature to electric resistance of the superconductive material is shown in FIG. 15, curve b and the relation of magnetic field to critical current density thereof is shown in FIG. 16, curve b.

EXAMPLE 10

Manufacture of superconductive material of NbC.

A rolled Nb sheet having a thickness of 0.01 mm was spattered with carbon to form a carbon coating of 0.01 mm. The coated Nb sheet was wound tightly into a coil having an outer diameter of 15 mm. The coil was covered with a shielding layer of Nb sheet having a thickness of 0.1 mm and then inserted into a stainless steel sheath having an outer diameter of 20 mm and an inner diameter of 15.2 mm. The pipe enclosing the shielding layer and the coil was wire-drawn to form a wire having a diameter of 0.5 mm. The formed wire was heat-treated at 1,300°C for 3 hours to obtain a superconductive material and the relation of critical temperature to electric resistance of the resulting superconductive material is shown in FIG. 15, curve c.

EXAMPLE 11

Manufacture of superconductive material of $V_3Ga$.

A rolled V sheet having a thickness of 0.05 mm was immersed in a melted Ga bath and coated with it to form the coated V sheet having a thickness of 0.07 mm, which was wound tightly into a coil having a diameter of 15 mm. The coil was inserted into a stainless steel pipe having an outer diameter of 20 mm and an inner diameter of 15 mm. The pipe enclosing the coil was wire-drawn to form a wire having a diameter of 0.5 mm. The resulting wire was heat-treated at 800°C for 1 hour to obtain a superconductive material, the relation of critical temperature to electric resistance of which is shown in FIG. 15, curve d.

What is claimed is:

1. A method of manufacturing superconductive magnets which comprises providing a laminated material by combining a material (A) selected from the group consisting of Nb, V and Mo metals and the alloys and intermetallic compounds thereof and a material (B) selected from the group consisting of Sn, Al, Zr, Ti, Pb, Ge, V, Si, Ga, C and Au elements and alloys thereof in such a composition that a superconductive alloy or a superconductive intermetallic compound is formed, winding the laminated material tightly into a coil, covering the coiled body with a shielding layer selected from the group consisting of Nb, Ta and Zr metals and the alloys thereof and stainless steel, inserting the coil covered with the shielding layer into a sheath composed of a material selected from the group consisting of Cu, Al, Ag, Au and Cd metals, alloys and intermetallic compounds thereof and stainless steel, subjecting said sheath enclosing said coil and said shielding layer to a treatment for reducing a cross-sectional area of said coil and heat-treating the thus treated coil at a temperature higher than 600°C and lower than a melting point of the sheath to form a superconductive material.

2. The method as claimed in claim 1, wherein said laminated material is produced by laminating a sheet or foil of said material (A) and a sheet or foil of said material (B).

3. The method as claimed in claim 1, wherein said laminated material is produced by rolling a sheet or foil of said material (A) and a sheet or foil of said material (B) to form a composite sheet or foil.

4. The method as claimed in claim 1, wherein said laminated material is produced by evaporating, sputtering or plating Sn, Al, Si, Ga, Ge, C or Au on a sheet of said material (A) to coat said material (A) sheet with Sn, Al, Si, Ga, Ge, C or Au.

5. The method as claimed in claim 1, wherein said treatment for reducing the cross-sectional area of said coil is a rolling, extruding or drawing treatment.

6. A method as claimed in claim 1 further including providing mechanical reinforcing material disposed on the coiled body, said shielding layer covering said coiled body together with said mechanical reinforcing material.

* * * * *